United States Patent
Sheaffer et al.

(10) Patent No.: US 12,356,166 B1
(45) Date of Patent: *Jul. 8, 2025

(54) METHOD AND SYSTEM FOR GENERATING SPATIAL PROCEDURAL AUDIO

(71) Applicant: Apple Inc., Cupertino, CA (US)

(72) Inventors: Jonathan D. Sheaffer, San Jose, CA (US); Yelena V. Menyaylenko, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/648,203

(22) Filed: Apr. 26, 2024

Related U.S. Application Data (63) Continuation of application No. 17/737,896, filed on May 5, 2022, now Pat. No. 11,997,463.

(60) Provisional application No. 63/196,643, filed on Jun. 3, 2021.

(51) Int. Cl.
*H04R 5/04* (2006.01)
*G06N 20/00* (2019.01)
*H04R 5/02* (2006.01)
*H04R 5/033* (2006.01)

(52) U.S. Cl.
CPC ............ *H04R 5/04* (2013.01); *G06N 20/00* (2019.01); *H04R 5/02* (2013.01); *H04R 5/033* (2013.01); *H04R 2430/20* (2013.01)

(58) Field of Classification Search
None
See application file for complete search history.

(56) References Cited

U.S. PATENT DOCUMENTS

| | | | |
|---|---|---|---|
| 10,735,887 | B1 | 8/2020 | McElveen et al. |
| 10,904,637 | B2 | 1/2021 | Hwang et al. |
| 11,509,865 | B2 | 11/2022 | Gronau et al. |
| 11,580,949 | B2 | 2/2023 | Elgee |
| 11,638,110 | B1 | 4/2023 | Donley et al. |
| 2019/0034269 | A1 | 1/2019 | Kalavade et al. |

OTHER PUBLICATIONS

Morgado et al., "Self-Supervised Generation of Spatial Audio for 360° Video", 32nd Conference on Neural Information Processing Systems, 2018, pp. 1-11.

*Primary Examiner* — Paul W Huber
(74) *Attorney, Agent, or Firm* — Aikin & Gallant, LLP (57) ABSTRACT

A method performed by a programmed processor, the method including receiving an input noise signal, generating, using a machine learning model that has an input based on the input noise signal, a mono audio signal that includes a sound and a spatial parameter for the mono audio signal, and generating spatial audio data by spatially encoding the mono audio signal according to the spatial parameter.

22 Claims, 5 Drawing Sheets

METHOD AND SYSTEM FOR GENERATING SPATIAL PROCEDURAL AUDIO

CROSS-REFERENCE TO RELATED APPLICATION

This application is a continuation of co-pending U.S. patent application Ser. No. 17/737,896 filed on May 5, 2022, which claims the benefit of priority from U.S. Provisional Patent Application Ser. No. 63/196,643 filed Jun. 3, 2021, which is hereby incorporated by this reference in its entirety.

FIELD

An aspect of the disclosure relates generating spatial procedural audio. Other aspects are also described.

BACKGROUND

Procedural audio may be non-linear, often synthetic sound, created in real-time according to a set of programmable rules and live input. Procedural sound design is about sound design as a system, an algorithm, or a procedure that re-arranges, combines, or manipulates sound assets so they might produce a greater variety of outcomes and/or be more responsive to interaction.

SUMMARY

Procedural audio is important for generating realistic sound components for many applications, such as for video games, extended reality (XR) environments (e.g., virtual reality (VR), mixed reality (MR), etc.), as well as comfort noises and soundscapes. The main benefit of procedural audio compared to using libraries of pre-recorded materials, is that the procedural audio may be generated on-the-fly, therefore ensuring that the audio is unique for a given situation. Traditional procedural audio techniques have many disadvantages. Computer applications that implement these techniques rely on both physical characteristics of an object (e.g., contained within image data that is captured by one or more cameras) for which procedural audio is to be produced and semi-empirical models of objects that emit the desired sound. For example, to produce sounds of birds chirping, applications require input video that includes birds, as well as the empirical models that represent sounds (e.g., chirps) produced by those particular birds. In addition, such applications may not produce the audio with sufficient realism.

The present disclosure solves these deficiencies by providing a method performed by an audio system for generating realistic audio effects and ambiences using machine learning (ML) models. For instance, a ML model (e.g., a Deep Neural Network (DNN)), may be a generative model (such as a Generative Adversarial Network (GAN)) that is configured to generate spatial procedural audio output in response to input. In particular, a GAN may be used that has an input based on an (first) input noise signal (e.g., a signal that contains noise such as white noise or colored noise) to generate a mono audio signal that includes a sound produced by an object (e.g., a door slam) and a spatial parameter for the mono audio signal. The spatial parameter may include a Direction of Arrival (DOA) of the sound and/or a diffuseness of the sound. In the case of the door slam, the DOA may indicate a location from which the sound is to originate (e.g., within an XR environment). The mono audio signal may be spatially encoded according to the spatial parameter to generate spatial audio data for the sound. For instance, the spatial audio data may include multichannel audio in a surround sound multi-channel format (e.g., 5.1, 7.1, etc.), a Vector-Based Amplitude Panning (VBAP) representation of the sound, a Higher Order Ambisonics (HOA) representation of a sound space that includes the sound, etc. As a result, the spatial audio data that is generated from the use of the DNN may be realistic and have unique context-dependent spatial characteristics of the audio (e.g., the door slam coming from one point in space) according to the generated spatial parameter. Thus, the present disclosure generates the spatial audio data by performing audio signal processing operations only, rather than needing to rely on image (or video) data and semi-empirical models as in traditional techniques. Accordingly, the present disclosure uses the DNN to "imagine" (e.g., in real-time) how certain audio objects or soundscapes sound like (signal-wise), as well as imagine the overall resulting sound field including most (or all) spatial information.

In one aspect, the system may be configured to generate a different (e.g., unique) sound each time the ML model is used. For instance, the system may receive a second input noise signal, and may generate, using the ML model that has an input based on the second input noise signal, a second mono audio signal that includes a second sound that is different than the first sound contained within the first mono audio signal. In particular, both sounds may be of the same class-type, such as being birds chirping, whereas the first sound is different than the second sound (e.g., being two distinguishable sounds of birds chirping). In some aspects, the generation of the different sounds may be the result of the input noise signals being different from one another (e.g., containing different spectral content). In some aspects, along with (or in lieu of) the generation of different sounds, the use of different input audio noise signals may result in the generation of different spatial parameters by the machine learning model.

According to another aspect of the present disclosure describes a method performed by the system for training the ML model for generating procedural audio. In one aspect, the ML model may be a generative model, such as a GAN. To train the GAN, the system obtains an input noise signal, and receives spatial audio data (e.g., HOA audio data). The system generates a first mono audio signal and a first spatial parameter from the spatial audio data as "real" (or known) audio training data. The system trains the GAN to generate different mono audio signals and different spatial parameters for the different mono audio signals in response to different input noise signals as input for the GAN, using the input noise signal and the real audio data. In particular, the system performs generative-adversarial training in which an audio data generator that generates mono audio signals and spatial parameters using audio noise signals as generated (e.g., "fake") data, and an audio data discriminator that distinguishes between the fake data and the real training data are trained separately.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations, (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1:
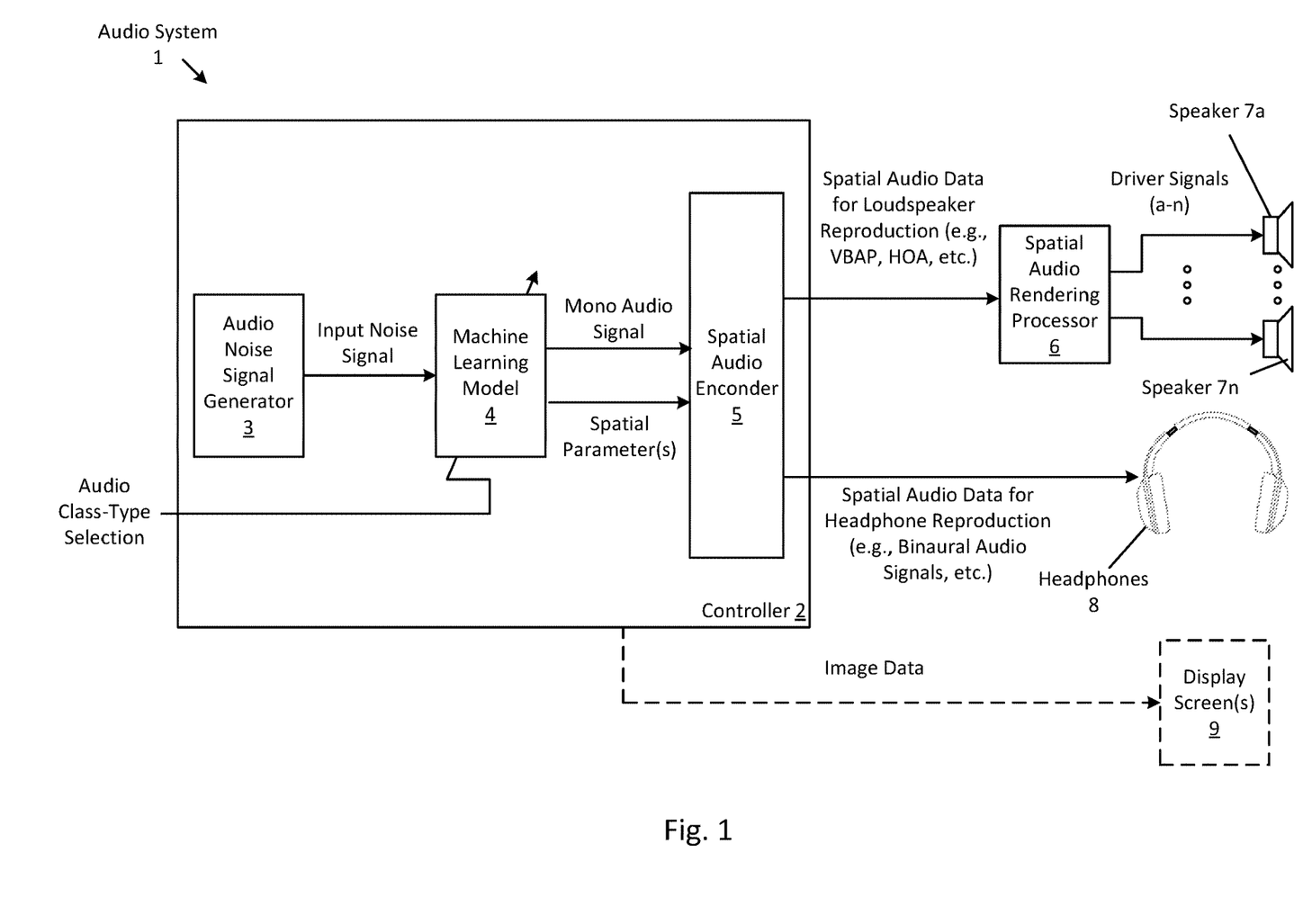
FIG. 1 shows a block diagram of an audio system for generating spatial audio data according to one aspect.

FIG. 1 shows a block diagram of an audio system 1 for generating spatial audio data according to one aspect. In particular, this system is for generating spatial procedural audio using a machine learning (ML) model. This figure illustrates a controller 2, a spatial audio rendering processor 6, and audio and image output devices that include one or more speakers 7a-7n, headphones 8, and one or more display screens 9 of the audio system 1. In one aspect, the system may include more or less elements (or components). For instance, the system may include one or more microphones that are configured to capture sound as microphone signals, and/or may include one or more cameras that are configured to capture image data. In another aspect, the audio system may not include the one or more display screens 9 (as illustrated by being a dashed-line box), speakers 7a-7n, or headphones 8.

In one aspect, the audio system 1 may include one or more electronic (audio) devices that may include one or more of the electronic components illustrated herein. In particular, at least some of the illustrated components may be a part of one or more electronic devices. For example, the controller 2 may be a part of any electronic device that is configured to perform one or more audio signal processing operations, such as a desktop computer, a tablet computer, a smart phone, a wearable device (e.g., a smart watch), etc. In one aspect, each of the output devices may be (or may be a part of) separate electronic devices, such as the speakers being a part of (one or more) loudspeakers (e.g., a smart speaker), one or more stand-alone speakers, a home theater system, or an infotainment system that is integrated within a vehicle. In another aspect, the display screen 9 may be a part of a display device (e.g., a television or a display of an electronic device, such as a laptop display). In another aspect, at least some of the components may be a part of one device. As an example, the spatial audio rendering processor and the speakers 7a-7n may be a part of one audio output device, such as a smart speaker. As another example, the headphones 8 and the display screen may be a part of another audio output device, such as a HMD (e.g., smart glasses).

Each of the speakers 7a-7n may be an electrodynamic (speaker) driver that may be specifically designed for sound output at certain frequency bands, such as a subwoofer, tweeter, or midrange driver, for example. In one aspect, any of the drivers may be a "full-range" (or "full-band") electrodynamic driver that reproduces as much of an audible frequency range as possible. In one aspect, each of the speaker drivers may be a same type of speaker driver (e.g., both speaker drivers being a full-range driver. In another aspect, at least some of the drivers may be different (e.g., one driver being a woofer, while another driver is a tweeter).

The headphones 8 are illustrated as being over-the-ear headphones that are designed to be worn on a user's head, and includes at least two speaker drivers for outputting sound into (or is directed towards) the user's ears (e.g., having a left speaker driver in a left ear cup and a right speaker driver in a right ear cup). In another aspect, the headphones may be any type of head-worn audio output device, such as on-ear headphones or in-ear headphones (or earphones). As described herein, at least some of the components illustrated in this figure may be a part of one device. As another example, at least some of the speakers 7a-7n may be a part of the headphones, and may be "extra-aural" speaker drivers that are arranged to project sound into the ambient environment, which are in contrast to speaker drivers contained within ear cups of the headphones 8 that project sound into the user's ears, as described herein.

The display screen(s) 9 may be any type of display (e.g., liquid crystal display (LCD), organic light-emitting diode (OLED), etc.) that is configured to display image data. In one aspect, in the case in which the displays are a part of a HMD, the system may include at least one display that is arranged to be in front of one or both of the user's eyes. In another aspect, the display may be an optical display that is configured to project digital images upon a transparent (or semi-transparent) overlay, through which a user can see.

The controller 2 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller may be configured to perform audio signal processing operations, such as implementing a ML model (or algorithm) for generating spatial procedural audio as spatial audio data for output through one or more audio output devices (e.g., the speakers 7a-7n, the headphones 8, etc.). More about the operations performed by the controller is described herein.

In one aspect, operations performed by the controller and/or spatial audio rendering processor may be implemented in software (e.g., as instructions stored in memory and executed by either controller) and/or may be implemented by hardware logic structures as described herein.

The spatial audio rendering processor 6 may be any type of processor, as described herein. Although illustrated as being separate from the controller 2, in one aspect, both the controller and processor may be one processing device. In some aspects, the processor 6 may be configured to perform spatial rendering operations upon spatial audio data in order to produce one or more driver signals (e.g., signals a-n) for driving one or more of the speakers 7a-7n). More about the processor is described herein.

As shown, at least some of the components of the audio system 1 are communicatively coupled to each other. For instance, the controller 2 is communicatively coupled to the spatial audio rendering processor 6, the headphones 8, and the display screen(s) 9, and the rendering processor is communicatively coupled to the speakers 7a-7n. In one aspect, the components may be coupled via a wired and/or wireless connection (e.g., via any wireless communication protocol, such as BLUETOOTH protocol). During an established wireless connection, data (e.g., spatial audio data) may be transmitted between components in data packets (e.g., Internet Protocol (IP) packets). In another aspect, data may be exchanged through any known method.

As illustrated, the controller 2 may have one or more operational blocks, including an audio noise signal generator 3, one or more ML model(s) 4, and a spatial audio encoder 5.

The audio noise signal generator 3 is configured to generate (or produce) an input (audio) noise signal. In one aspect, the generator may be an algorithm that is configured to perform one or more operations to output electronic noise (e.g., a random signal). In another aspect, the generator may be a noise generator circuit. In some aspects, the audio noise signal generator may be configured to generate any type of noise signal, such as white noise or colored noise (pink noise, Brownian noise, etc.). In some aspects, each generated noise signal may be unique or different (e.g., having different spectral content, etc.) with respect to other signals that are (or were) generated by the generator 3. In some aspects, the generator may be any type of random noise generator that is configured to generate a noise signal.

The ML model 4 is configured to obtain (receive) one or more input noise signals (e.g., generated by the generator 3) as input, and is configured to output a mono audio signal that includes one or more sounds and one or more spatial parameters. Specifically, the ML model is configured to generate the mono signal that includes a sound and the spatial parameter for the mono signal, in response to an input based on the audio noise signal. In one aspect, the ML model may be (or include) a deep neural network (DNN), such as a generative model that is trained to output a (e.g., different or same) mono signal and/or one or more (e.g., different or same) spatial parameters in response to receiving noise signals. For example, different (input) noise signals may result in the model outputting different mono signals, where the signals contain different sounds of a same class-type (e.g., two different sounds of birds chirping) and/or different spatial parameters. In one aspect, the generative model may be any type of model, such as a Generative Adversarial Network (GAN) that includes a generator and/or a discriminator, both of which may be separate (and independent) neural networks (e.g., the generator being a deconvolution neural network and the discriminator being a convolution neural network). More about the generator and the discriminator are described herein.

In one aspect, the (e.g., controller of the) audio system may include one or more ML models that are each individually trained to generate different types (e.g., class-types) of audio objects. For example, the controller may include a (e.g., first) ML model that is trained to generate a sound of a first class-type (e.g., sound of a bird chirping), and may include another (e.g., second) ML model that is trained to generate a sound of a second class-type (e.g., sound of a door slamming). In other aspects, the system may include ML models with different class-types for the same (or similar) audio object. For example, the system may include models for different types of door slamming (e.g., a wooden door, a plastic door, a metal door, etc.).

In one aspect, the controller 2 may be configured to select one (or more) ML models based on a particular class-type of sound. For instance, the controller may receive an input selection of an audio class-type, which indicates which ML model is to be used to generate output of an audio signal for the particular class-type (e.g., in response to the input noise signal). In one aspect, the selection may be a user-selection, via an input device, such as a selection of a graphical user interface (GUI) item that is presented on the display screen 9. The selection of the GUI item may be in response to a user-selection upon the screen, which may be a touch-sensitive display screen. In another aspect, the selection may be based on other criteria. For instance, the selection of the ML model may be based on an XR environment that is being (or is to be) presented by the audio system. In particular, when a user is participating within an XR environment, the audio system may determine that a particular sound is to be emitted within the environment (e.g., to be output by one or more speakers, and to be perceived by the user as if emanating from the environment). For example, when the user is participating within an XR environment of a dog park, the audio system may determine that one or more sounds of dogs barking is to be played back. Thus, the audio system may select one or more ML models that are trained to output dog barks. In one aspect, the determination may be performed automatically (e.g., without user intervention). In another aspect, the ML model may be trained on many (one or more) class-types, such as being trained to output birds chirping and doors slamming. In this case, the selection of a class-type may be a one-hot encoding input into the ML model that indicates what class-type the model is to output. More about the selection of the ML model is described herein.

In some aspects, the one or more spatial parameters that are generated by the ML model that provides spatial context to the mono audio signal. In one aspect, the spatial parameter may indicate that the sound is to be localized at a particular location within a sound space or within a direction at which the sound of the mono signal is to be perceived by the user. For example, the spatial parameter may include a Direction of Arrival (DOA). In another aspect, the spatial parameter may indicate that the sound is an ambient sound, in which case the parameter may indicate a diffuseness (or a level of diffuseness) of the sound. In one aspect, the model may generate the parameters based on the model's class-type. For instance, the model may generate a diffuseness, when the model generates a wind sound, whereas the model may generate a DOA when the model generates a dog bark.

As described herein, a model may generate different spatial parameters based on input of different noise signals. For example, in the case of a model generating DOAs, two different DOAs may be generated, whereby a sound's spatial context is to be perceived by a user as emanating from a frontal position in response to one noise signal and the sound's spatial context may be perceived from emanating from a different position in response to a different noise signal. In another aspect, the spatial parameters may change entirely in response to different noise signal inputs (e.g., one signal resulting in a DOA, while another results in a level of diffuseness).

The spatial audio encoder 5 is configured to receive the mono audio signal and the spatial parameter(s) generated by the ML model 4, and is configured to generate spatial audio data by spatially encoding (e.g., by performing spatial synthesis upon) the mono audio signal according to the spatial parameter. Specifically, the spatial audio data may include a virtual sound source from which the sound of the mono audio signal may be produced by one or more speakers. In one aspect, the encoder may generate spatial audio data for loudspeaker reproduction, which is audio data that when rendered may be outputted via one or more speakers of one or more loudspeakers. In some aspects, the generated spatial audio data may include an angular/parametric reproduction of the virtual sound source, such as Higher Order Ambisonics (HOA) representation of a sound space that includes the sound (e.g., positioned at a virtual position within the space), a Vector-Based Amplitude Panning (VBAP) representation of the sound, etc. In another aspect, the spatial audio data may include a channel-based reproduction of the sound, such as multi-channel audio in a surround sound multi-channel format (e.g., 5.1, 7.1, etc.). In some aspects, the spatial audio data may include an object-based representation of the sound that includes one or more audio channels that has (at least a portion of) the sound and metadata that describes the sound. For instance, the metadata may include spatial characteristics (e.g., elevation, azimuth, distance, etc.) of the sound (e.g., according to the spatial parameter). In some aspects, the encoder may generate spatial audio data for headphone reproduction, which is audio data that when rendered may be outputted via one or more speakers of headphones (e.g., speakers that direct sound towards a user's ears and/or into a user's ear canals). In one aspect, the spatial encoder may generate the spatial audio data for headphone reproduction by applying spatial filters (e.g., head-related transfer functions (HRTF)) according to the spatial parameter of the mono audio signal to produce binaural audio signals for driving speakers of headphones (e.g., headphones 8). In some aspects, along with (or in lieu of) applying one or more spatial filters, the encoder may perform upmixing audio processing operations to produce at least two channels (e.g., a left channel and a right channel). In another aspect, the spatial encoder may perform any known spatial synthesis method in order to generate any type of spatial audio data, which may include but is not limited to the examples describe herein.

The spatial audio rendering processor 6 is configured to generate one or more audio (driver) signals (signals a-n) for driving one or more speakers 7a-7n, respectively, by spatially rendering the spatial audio data. Specifically, the processor may spatially render the sound (e.g., of the mono audio signal) by performing one or more rendering operations upon the spatial audio data to cause one or more of the speakers to produce spatial audio cues to give a user the perception that the sound (e.g., of the mono audio signal) is being emitted from a particular location within an acoustic space that corresponds to the virtual sound source of the sound. In one aspect, the processor may render the data according to one or more characteristics of the speakers 7a-7n, such as the number of speakers, the location of the speakers, and the type of speakers (e.g., tweeters, woofers, etc.). For example, in the case of the spatial audio data containing multi-channel audio, the rendering processor may spatially render the audio according to the number (and type) of speakers to produce surround sound. In one aspect, the processor may perform any known rendering method to render the data into one or more signals.

In one aspect, the spatial audio rendering processor 6 may perform one or more additional audio signal processing operations upon the spatial audio data. For example, the processor may perform beamformer operations to produce spatially selective sound output through the speakers that may form an array of speakers. For instance, the array may produce directional beam patterns of sound that are directed towards locations within the environment. To do this, the processor may process the spatial audio data by applying beamforming weights (or weight vectors), such that the sound is directed to the location. In another aspect, the rendering processor may perform other operations, such as applying an acoustic noise cancellation (ANC) function to reduce background noise.

Figure 2:
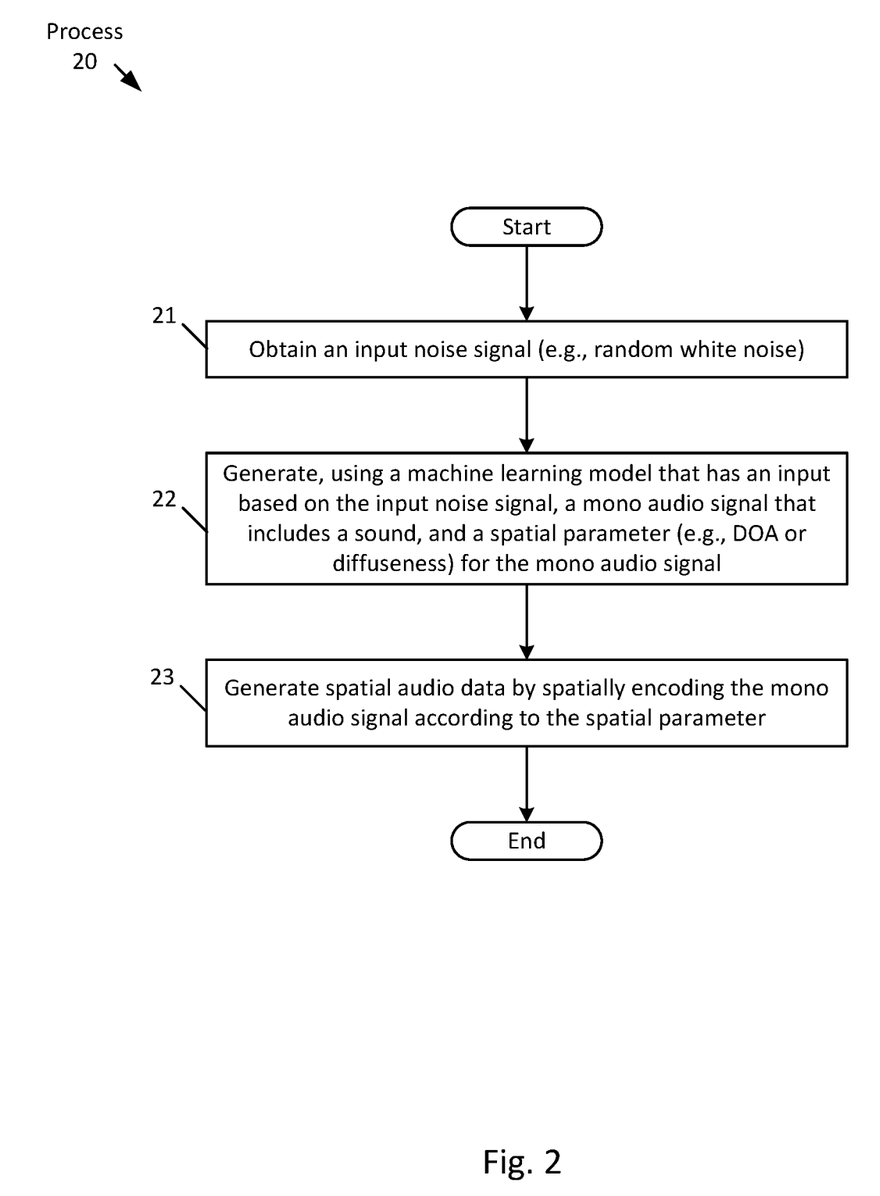
FIG. 2 is a flowchart of one aspect of a process to generate spatial audio data according to one aspect.

FIG. 2 is a flowchart of one aspect of a process 20 to generate spatial audio data according to one aspect. In one aspect, at least a portion of the process 20 may be performed by the (e.g., controller 2 of the) audio system 1, as illustrated in FIG. 1. The process 20 begins by the controller obtaining an input noise signal, such as random white noise (at block 21). For instance, the signal may be generated by the generator 3. In another aspect, the controller may receive the signal from another source, such as a noise generator circuit. The controller generates, using a ML model (e.g., model 4) that has an input based on the input noise signal, a mono audio signal that includes a sound and a spatial parameter (such as DOA or diffuseness) for the mono audio signal (at block 22). The controller generates spatial audio data by spatially encoding the mono audio signal according to the spatial parameter (at block 23). Thus, as described herein, the generation of the spatial procedural audio, specifically the generation of the mono audio signal and the spatial parameter(s), and the generation of the spatial audio data are performed according to one or more audio signal processing operations only (e.g., without the need for image processing of image data captured by one or more cameras). This is in contrast to conventional procedural audio generation techniques that require image data and empirical models of audio objects.

Figure 3:
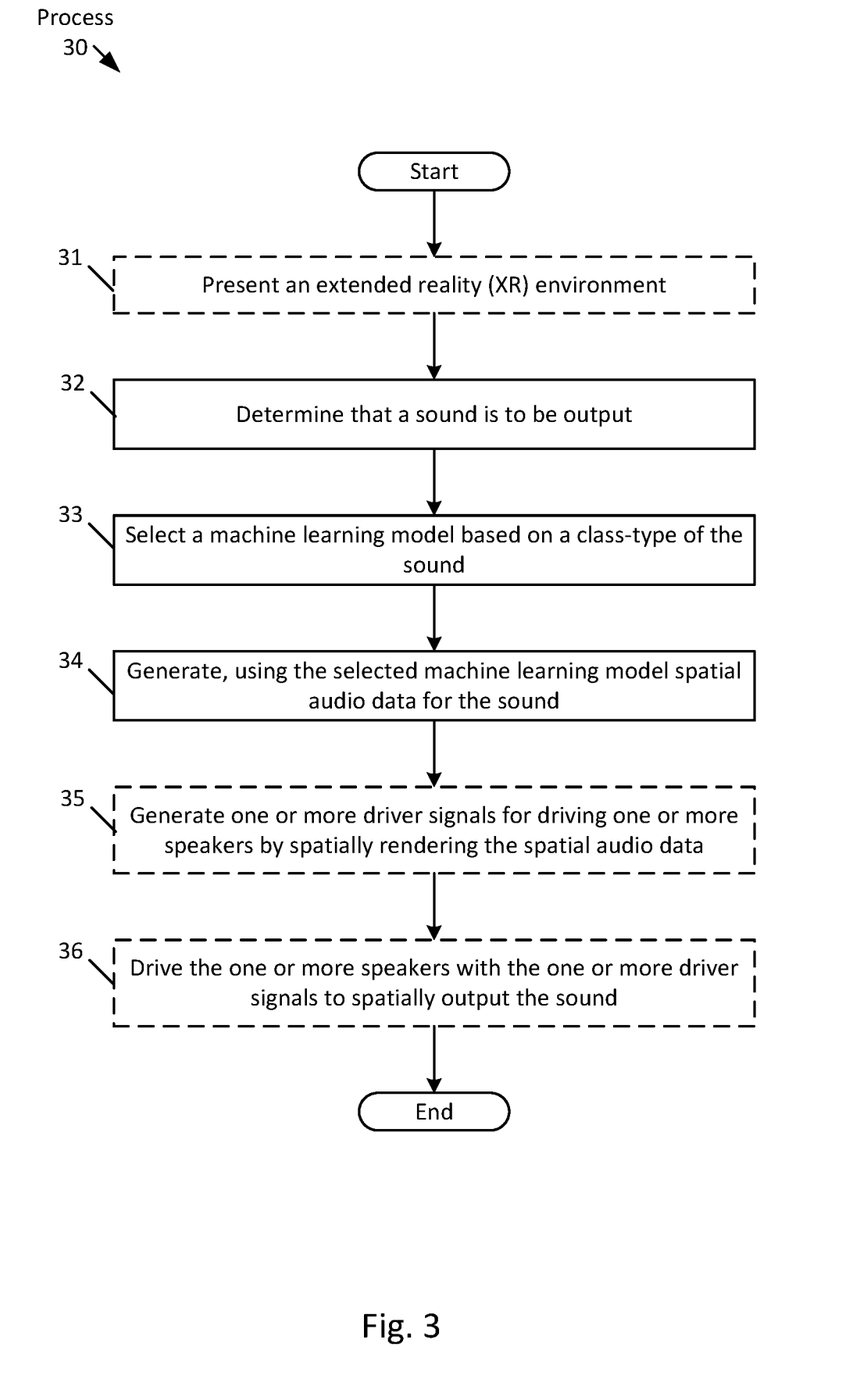
FIG. 3 is a flowchart of one aspect of a process to generate and output spatial audio data that is generated using a machine learning (ML) model according to another aspect.

FIG. 3 is a flowchart of one aspect of a process 30 (which may be performed by the controller 2 and/or the spatial audio rendering processor 6 of the audio system 1 of FIG. 1) to generate and output spatial audio data that is generated using a ML model according to another aspect. Specifically, this process illustrates operations performed by the processor to generate procedural audio using one or more of the operations of process 20 of FIG. 2.

The process 30 begins by presenting a XR environment in which a user (e.g., of the audio system 1) is participating (at block 31). In particular, the XR environment may be presented by outputting sounds (or audio) originating from the XR environment via the one or more speakers 7a-7n and/or the headphones, and by displaying image data of the environment on the one or more display screens 9. In one aspect, the audio system may produce image data by visually rendering the XR environment from a (e.g., first-person) perspective of an avatar associated with a user that is participating within the XR environment. In some aspects, the controller (and/or the rendering processor 6) may spatially render the XR environment to produce three-dimensional (3D) audio of the environment. In some aspects, the XR environment may be spatial and/or visual rendered according to changes in the avatar's position and/or orientation, which may correspond to movements (e.g., head movements) of the user. For instance, the controller may adjust the visual rendering such that the environment rotates with rotation of the user's head (e.g., while the user wears a HMD).

The controller 2 determines that a sound is to be output (at block 32). For instance, the sound may be a background noise, such as a dog barking or a door slamming. In one aspect, the determination may be based on the XR environment, such as the user moving through a virtual environment (e.g., an avatar of the user moving from inside a house to outside). Specifically, the sound may be associated with an object (e.g., a dog) within the XR environment (e.g., a dog that is barking outside the house). In other aspects, the sound may be a background sound within the XR environment. In which case, the object associated with the sound may not be contained within image data of the XR environment that is to be displayed on the display screen (e.g., the barking dog may not be viewable by the user within the XR environment). The controller selects a ML model based on a class-type of the sound (at block 33). For example, the controller may select the ML model from several ML models (where each of the several ML models may be associated with a different (or similar) class-type of the sound) that is associated with the class-type of sound that is to be output. In one aspect, the selection may be based on a one-hot encoding input, as described herein. The controller generates, using the selected ML model, spatial audio data of the sound (at block 34). Specifically, the controller may perform the operations described in process 20 of FIG. 2).

The spatial audio rendering processor 6 generates one or more driver signals for driving one or more speakers by spatially rendering the spatial audio data (at block 35). The processor drives the one or more speakers with the one or more driver signals to spatially output the sound (at block 36). For example, when the spatial audio data includes HOA audio data, the processor may spatially render the data to generate one or more driver audio signals (e.g., based on the speakers of the audio system 1), which when used to drive one or more of the speakers produces a sound field that includes the sound.

Some aspects perform variations of the processes 20 and 30. For example, the specific operations of the processes may not be performed in the exact order shown and described. The specific operations may not be performed in one continuous series of operations and different specific operations may be performed in different aspects. In one aspect, at least some of the operations described herein may be optionally performed, such as the operations in blocks 31, 35, and/or 36 (as illustrated by having dashed boundaries).

Figure 4:
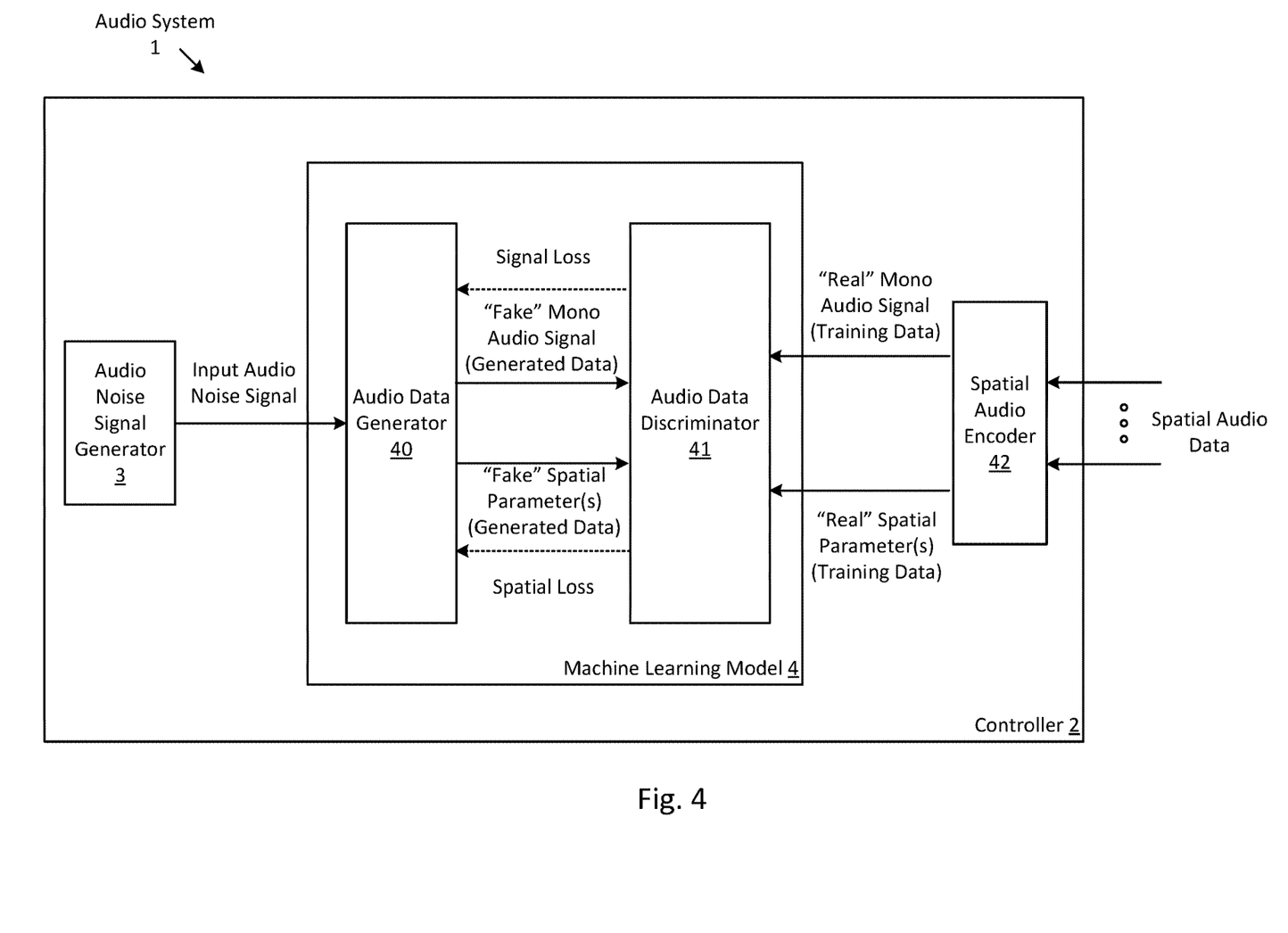
FIG. 4 shows a block diagram of an audio system for training a ML model for generating spatial audio data according to one aspect.

FIG. 4 shows a block diagram of the audio system 1 for training the ML model 4 for generating spatial audio data according to one aspect. Specifically, this figure shows the controller 2 training a ML model, such as a generative model (e.g., one or more GANs). The controller 2 includes one or more operational blocks (which may be similar or the same as blocks shown in FIG. 1), such as the audio noise signal generator 3 and the ML model 4. The controller also includes a spatial audio encoder 42 that is configured to receive input spatial audio data that is in any format, such as HOA format, VBAP, etc. In one aspect, the input spatial audio data may be in any format described herein (e.g., that may be produced by the spatial audio encoder 5 in FIG. 1). In some aspects, the input spatial audio data may be "real" or known audio data (e.g., known sounds, such as birds chirping, with spatial data, such as DOA) that may be used as training data to train the ML model. In one aspect, this spatial audio data may be in the same (or different) audio format as the spatial audio data produced by the controller 2, as described in FIGS. 1-2. The encoder is also configured to perform spatial audio encoding techniques to transform the input spatial audio data into a (e.g., first) mono audio signal that contains a (known) sound (e.g., a door slamming), and one or more (e.g., first) spatial parameters for the first mono audio signal, as real training data. In one aspect, the controller may receive several (one or more) sets of spatial audio data, each set being associated with (or including) one or more audio signals, each associated with one or more spatial parameters.

The controller 2 trains the ML model 4 to generate different mono audio signals (e.g., different sounds of doors slamming) and different spatial parameters (e.g., each parameter indicating a different DOA) for the different signals in response to different input noise signals as input for the ML model. Specifically, the controller trains the ML model using an input audio noise signal received from the audio noise signal generator 3, and the first mono audio signal and the first spatial parameter (e.g., as real data) generated by the audio encoder 42.

As described herein, the ML model may be a generative model that is trained by the system to generate different spatial audio data (e.g., spatial procedural data) in response to input noise signals. Specifically, as shown, the ML model is a GAN that includes an audio data generator 40 and an audio data discriminator 41. In one aspect, the generator and the discriminator may both be individual neural networks. For example, the discriminator may be any type of neural network (e.g., a convolutional neural network, etc.) that is configured to classify (or distinguish) one set of data (e.g., "fake" data) from another set of data (e.g., real data), and the generator may be any type of neural network (e.g., a deconvolution neural network) that is configured to generate data (e.g., fake data). The system may perform generative-adversarial training in which the generator is trained to generate fake spatial audio data and the discriminator is trained to distinguish between the fake spatial audio and real spatial audio data. The goal ultimately being that the discriminator distinguishes real data from fake data with equal probability (e.g., 50% of the time), also known as convergence.

In one aspect, the audio system 1 alternates training between the generator 40 and the discriminator 41. Specifically, the audio data generator 40 is configured to receive one or more input noise signals (each of which may be random and/or different signals having different spectral content) from the signal generator 3, and is configured to generate mono audio signals and spatial parameter(s) of the signals as the fake spatial audio data. The system then trains the discriminator, while pausing or keeping (e.g., one or more weights of) the generator constant. In particular, the discriminator is configured to receive the training data from the encoder 42 and/or the generated data from the generator 40, and is configured to distinguish (or predict) between the fake and real data (e.g., for one or more epochs of data). Specifically, at each pass the discriminator is configured to label the real data as "1" and the generated data from the generator as "0".

In one aspect, the system evaluates how well the discriminator performed the classification based on a loss function of the discriminator. In one aspect, the loss function (also known as a cost function) may represent a difference between the real data and the fake data (such as being 1) a difference between real mono audio signals and generated audio signals and 2) a difference between real spatial parameters and generated spatial parameters). In some aspects, the loss function may be any loss function. Thus, the loss function may produce a loss that indicates how accurate the predictions of the discriminator were. In the present case, the discriminator may produce a spatial loss that indicates how well the discriminator classified mono audio signals and a spatial loss that indicates how well the discriminator classified spatial parameters. By evaluating both the mono audio signals and the spatial parameters jointly, this ensures that they are congruent with the training data (e.g., to avoid a dog bark being diffusely generated). In some aspects, the training may involve using an optimization algorithm to minimize the loss function in order to find a set of weights (or parameters) for the discriminator that best map inputs to outputs. In some aspects, the weights represent the strength of a connection between one or more nodes in the neural network.

After the weights of the discriminator are updated, the system trains the generator to produce better (or more realistic) generated spatial audio data. In particular, the generator receives one or more input noise signals, and receives the signal loss and the spatial loss that is back-propagated by the discriminator, using these losses for its loss function. The generator generates fake spatial audio data, from which the discriminator is trained to predict whether the fake data is real. The losses of the discriminator are then fed back to the generator in order to maximize the generators loss function. In some aspects, these steps are repeated for one or more epochs of the training data.

In some aspects, the training of the ML model 4 ensures that audio signals produced by the ML model (e.g., having sounds of a particular class-type), are also associated with respective spatial parameters that are produced by the model. As described herein, this ensures that directional sounds produced by the model are associated with spatial parameters that are more directional than diffuse.

Figure 5:
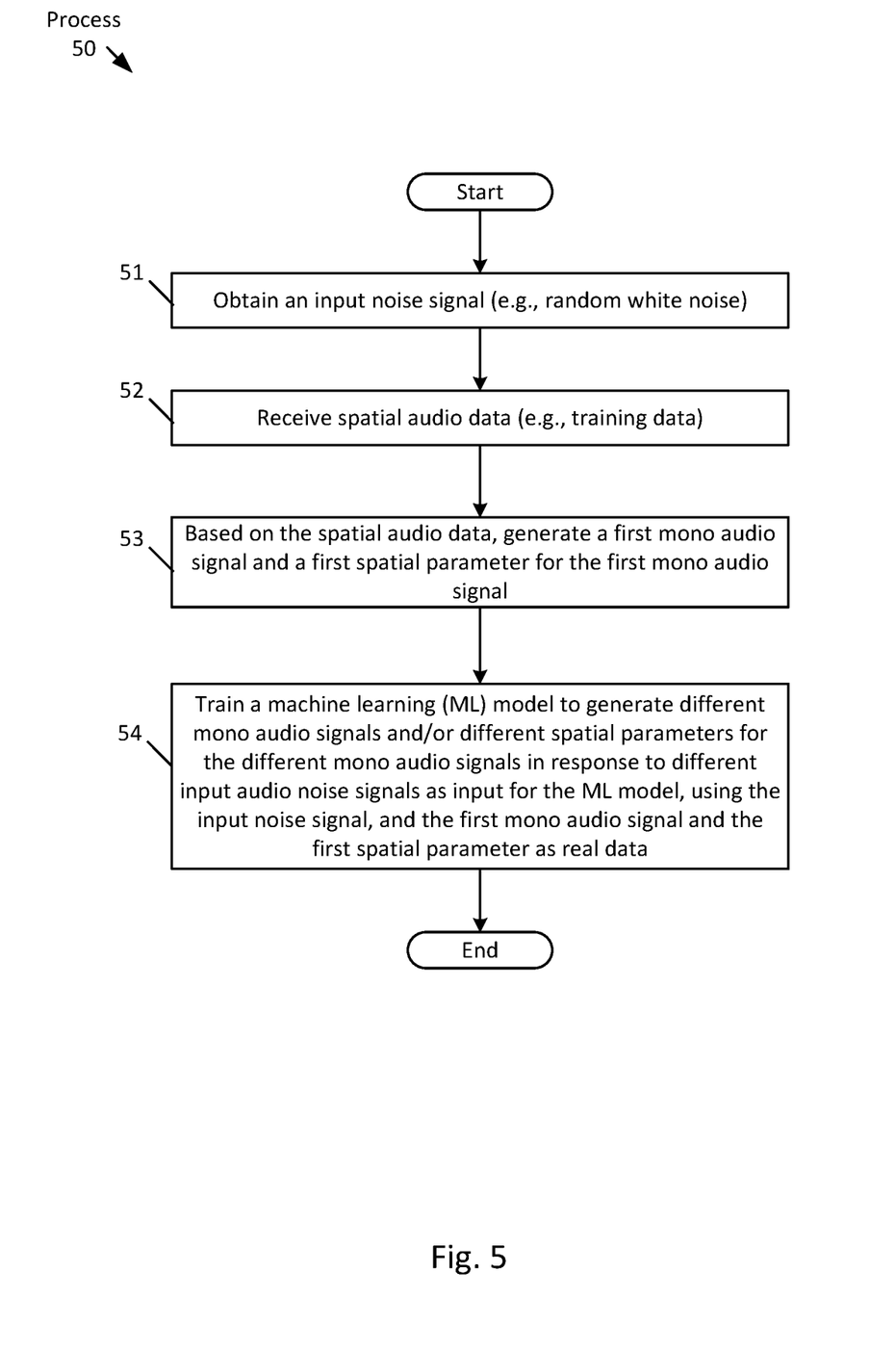
FIG. 5 is a flowchart of one aspect of a process to train the ML model according to one aspect.

FIG. 5 is a flowchart of one aspect of a process 50 to train the ML model 4 according to one aspect. In particular, this process illustrates operations performed by (e.g., the audio data generator 40 and the audio data discriminator 41 of the ML model 4 of) the controller 2 to train the ML model 4 to generate spatial audio data. The process 50 begins by the controller obtaining an input noise signal (e.g., random white noise) (at block 51). In one aspect, the controller may receive the signal from the noise generator 3, or from another source (e.g., a separate noise generator circuit). The controller obtains spatial audio data as training data (at block 52). In some aspects, the training data may be received from a local memory source (e.g., memory of the controller), or from a remote source (e.g., a remote server with which the controller is communicatively coupled). From the spatial audio data, the controller (or more specifically the encoder 42) generates (at least) a first mono audio signal and (at least) a first spatial parameter for the first mono audio signal (at block 53). The controller trains the ML model to generate different mono audio signals and/or different spatial parameters for the different mono audio signals in response to different input noise signals as input for the ML model, using the input noise signal, and the first mono audio signal and the first spatial parameter as real training data (at block 54). For instance, to train the ML model (e.g., a GAN), the input noise signal is used to generate a second mono audio signal and a second spatial parameter for the second mono audio signal as generated data, and a loss function is minimized using the real data and the generated data.

Some aspects perform variations of the process 50. For example, the specific operations of the processes may not be performed in the exact order shown and described. The specific operations may not be performed in one continuous series of operations and different specific operations may be performed in different aspects. For instance, to train the ML model, the controller may use several sets of training data and several (e.g., different) input noise signals that are used to generate several sets of generated data by the audio data generator 40. In another aspect, the operations performed to train the ML model may include minimizing at least one loss function (e.g., of the discriminator and/or the generator) using the real data and using generated data from the generator, as described herein.

In some aspects, the operations described herein may be performed to train the ML model to generate sounds (e.g., signals and/or spatial data) for one or more different class-types. For instance, the system may perform the process to train the ML model to generate sounds of doors slamming as one class-type, and train the model to generate sounds of birds chirping as another class-type. In some aspects, the ML model may be configured to generate interpolated sounds (e.g., sounds that are combinations of two or more sounds) based on being trained with different types of sounds. In this way, the ML model may generate new sounds (e.g., an interpolation between a door slamming and a bird chirping) along with spatial parameters in order to imagine new spatial data.

An aspect of the disclosure includes a method that includes obtaining an input noise signal and spatial audio data; based on the spatial audio data, generating a first mono audio signal and a first spatial parameter for the first mono audio signal; and training a machine learning (ML) model to generate different mono audio signals and different spatial parameters for the different mono audio signals in response to different input noise signals as input for the ML model, using the input noise signal, and the first mono audio signal and the first spatial parameter as real data.

In one aspect, the machine learning model is a generative adversarial network (GAN), wherein training the GAN comprises generating, using the input noise signal, a second mono audio signal and a second spatial parameter for the second mono audio signal as generated data; and minimizing a loss function using the real data and the generated data. In another aspect, the loss function represents 1) a difference between the first mono audio signal and the second mono audio signal and 2) a difference between the first spatial parameter and the second spatial parameter. In some aspects, the input noise signal comprises either white noise or colored noise. In one aspect, the spatial audio data comprises a Higher Order Ambisonics (HOA) representation of a sound space that includes the sound. In another aspect, the first and second spatial parameters comprise at least one of a Direction of Arrival (DOA) of the sound and a diffuseness of the sound. In some aspects, the sound is of a first class-type, wherein the method further comprises performing each of the obtaining of the input noise signal, the generating of the first mono audio signal and the first spatial parameter and the training of the ML model to train the machine learning model according to another sound of a second class-type.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the spatial audio data generation and training operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by at least one programmed processor, the method comprising:
   obtaining a generated noise signal;
   generating spatial audio data that comprises a sound of a virtual object for a system using a machine learning (ML) model that has an input based on the generated noise signal; and
   spatially rendering the spatial audio data at an output device.

2. The method of claim 1, wherein the ML model is a Generative Adversarial Network (GAN) model.

3. The method of claim 1, wherein the system is an extended reality (XR) environment.

4. The method of claim 1, wherein the system is a video game.

5. The method of claim 1, wherein the sound comprises at least one of a comfort noise and a soundscape.

6. The method of claim 1, wherein the sound is a type of sound, wherein the spatial audio data comprises a different sound of the type of sound based on a different generated noise signal as the input of the ML model.

7. The method of claim 1, wherein the spatial audio data comprises at least one of: multichannel audio in a surround sound multi-channel format, a Higher Order Ambisonics representation of a sound space that includes at least the sound, or binaural audio signals for driving at least one speaker of the output device.

8. The method of claim 1, wherein the generation of the spatial audio data is performed according to one or more audio signal processing operations only.

9. The method of claim 1 is performed by the at least one programmed processor of an electronic device that comprises the output device.

10. An electronic device comprising:
    a processor; and
    memory having instructions stored therein which when executed by the processor causes the electronic device to:

obtain a generated noise signal;

generate spatial audio data that comprises a sound of a virtual object for a system using a machine learning (ML) model that has an input based on the generated noise signal; and transmitting the spatial audio data to an output device for spatial rendering.

11. The electronic device of claim 10, wherein the ML model is a generative Adversarial Network (GAN) model.

12. The electronic device of claim 10, wherein the system is at least one of an extended reality (XR) environment and a video game.

13. The electronic device of claim 10, wherein the sound comprises at least one of a comfort noise and a soundscape.

14. The electronic device of claim 10, wherein the sound is a type of sound, wherein the spatial audio data comprises a different sound of the type of sound based on a different generated noise signal as the input of the ML model.

15. The electronic device of claim 10, wherein the generated noise signal includes either white noise or colored noise.

16. The electronic device of claim 10, wherein the electronic device is separate from the output device.

17. A non-transitory machine-readable medium having instructions which when executed by a processor of an electronic device:

obtain a generated noise signal;

generate spatial audio data that comprises a sound of a virtual object for a system using a machine learning (ML) model that has an input based on the generated noise signal; and cause the electronic device to transmit the spatial audio data to an output device.

18. The non-transitory machine-readable medium of claim 17, wherein the ML model is a Generative Adversarial Network (GAN) model.

19. The non-transitory machine-readable medium of claim 17, wherein the system is one of an extended reality (XR) environment and a video game.

20. The non-transitory machine-readable medium of claim 17, wherein the sound comprises at least one of a comfort noise and a soundscape.

21. The non-transitory machine-readable medium of claim 17, wherein the sound is a type of sound, wherein the spatial audio data comprises a different sound of the type of sound based on a different generated noise signal as the input of the ML model.

22. The non-transitory machine-readable medium of claim 17, wherein the spatial audio data comprises at least one of: multichannel audio in a surround sound multichannel format, a Higher Order Ambisonics representation of a sound space that includes at least the sound, or binaural audio signals for driving at least one speaker of the output device.

* * * * *